US010985555B2

(12) United States Patent
VanWyk et al.

(10) Patent No.: US 10,985,555 B2
(45) Date of Patent: Apr. 20, 2021

(54) SYSTEMS AND METHODS FOR LONG REACH HIGH EFFICIENCY POWER DISTRIBUTION

(71) Applicant: Valve Corporation, Bellevue, WA (US)

(72) Inventors: Eric Judson VanWyk, Seattle, WA (US); Staci Jane Elaan, Bellevue, WA (US)

(73) Assignee: VALVE CORPORATION, Bellevue, WA (US)

( * ) Notice: Subject to any disclaimer, the term of this patent is extended or adjusted under 35 U.S.C. 154(b) by 216 days.

(21) Appl. No.: 16/128,285

(22) Filed: Sep. 11, 2018

(65) Prior Publication Data

US 2020/0083707 A1     Mar. 12, 2020

(51) Int. Cl.
| H02J 3/00 | (2006.01) |
| H04L 12/10 | (2006.01) |
| H02M 3/335 | (2006.01) |
| H02M 3/337 | (2006.01) |

(52) U.S. Cl.
CPC ............ *H02J 3/00* (2013.01); *H02M 3/3376* (2013.01); *H02M 3/33569* (2013.01); *H04L 12/10* (2013.01)

(58) Field of Classification Search
CPC ....... H02J 3/00; H04L 12/10; H02M 3/33569; H02M 3/3376; H02M 1/44; H02M 2001/007; H02M 2001/0058; H02M 3/337; H02M 3/33592; Y02B 70/1433; Y02B 70/1475; Y02B 70/1491
See application file for complete search history.

(56) References Cited

U.S. PATENT DOCUMENTS

| 2,783,384 A | 2/1957 | Bright et al. |
| 5,003,622 A | 3/1991 | Ma et al. |
| 5,500,791 A * | 3/1996 | Kheraluwala ..... H02M 3/33576 363/17 |

(Continued)

FOREIGN PATENT DOCUMENTS

WO    WO-2015192133 A2 *  12/2015  .............. B60L 53/22

OTHER PUBLICATIONS

"An introduction to LLC resonant half-bridge converter", STMicroelectronics NV, Sep. 15, 2008, 64 pages.

(Continued)

*Primary Examiner* — Daniel Cavallari
(74) *Attorney, Agent, or Firm* — Seed Intellectual Property Law Group LLP

(57) ABSTRACT

Systems and methods for distributing power over a relatively long distance by sending high frequency alternating current (AC) over a transmission subsystem between a sender subsystem and a receiver subsystem. Power may be sent from the sender subsystem to the receiver subsystem over a transmission subsystem that includes first and second conductors, such as pair of shielded or unshielded wires twisted together. The sender subsystem may utilize a resonant converter to provide sinusoidal oscillation, which greatly reduces the radio emissions normally caused in DC systems due to high frequency current draws by a load. The receiver system may include a resonant converter or discontinuous conduction mode flyback converter, which provides DC power to a load.

30 Claims, 4 Drawing Sheets

(56) References Cited

U.S. PATENT DOCUMENTS

| | | | |
|---|---|---|---|
| 8,503,199 B1* | 8/2013 | Chapuis | H02M 1/4225 |
| | | | 363/37 |
| 9,107,259 B2 | 8/2015 | Rimmer et al. | |
| 9,163,815 B2* | 10/2015 | Elferich | H05B 45/37 |
| 9,425,700 B2* | 8/2016 | Lu | H02M 3/3376 |
| 9,648,690 B1* | 5/2017 | Chou | H05B 41/2983 |
| 2002/0163486 A1 | 11/2002 | Ronzani et al. | |
| 2013/0201729 A1* | 8/2013 | Ahsanuzzaman | H02M 1/4208 |
| | | | 363/21.12 |
| 2018/0062528 A1 | 3/2018 | Liu et al. | |
| 2020/0029057 A1* | 1/2020 | Holmes | H04N 9/3111 |

OTHER PUBLICATIONS

Alois et al., "600 W Half Bridge LLC Evaluation Board with 600 V CoolMOS™ C7", Jun. 24, 2015, 30 pages.

International Search Report and Written Opinion of International Patent Application No. PCT/US2019/050424, dated Nov. 18, 2019, 13 pages.

* cited by examiner

SYSTEMS AND METHODS FOR LONG REACH HIGH EFFICIENCY POWER DISTRIBUTION

BACKGROUND

Technical Field

The present disclosure generally relates to low voltage power distribution systems and methods.

Description of the Related Art

Traditionally, direct current (DC) power is used for power distribution in electronic systems because of the intrinsic safety of low voltage as well as the lack of electrical noise on a pure DC line. However, DC power is not always noise free in applications such as performance computing or the loading of displays, such as head-mounted displays (HMDs), which may draw current pulses at high frequencies (e.g., hundreds of kilohertz (kHz)). Demanding large current draws at high frequency over long lines (e.g., 5 meters, 10 meters, 30 meters) creates undesirable radio emissions, which may cause harmful interference to other radio devices and may run afoul of radio laws and regulations in various jurisdictions throughout the world.

Thus, there is a need to deliver power over relatively long transmission lines without causing undesirable levels of radio emissions that may negatively affect nearby devices.

BRIEF SUMMARY

A power distribution system to deliver power to a load may be summarized as including: a sender subsystem which may be summarized as including: a transformer including a primary winding and a secondary winding; and a resonant converter coupleable to a direct current (DC) power source, the resonant converter having a nominal resonant frequency that is tuned based at least in part on an impedance characteristic of the load, the resonant converter including a switch network and a resonant tank circuit operatively coupled to the switch network, the resonant tank circuit including the primary winding of the transformer; a transmission subsystem including: a first elongated conductor having a first end and a second end, the first end coupled to a first end of the secondary winding of the transformer; and a second elongated conductor having a first end and a second end, the first end coupled to a second end of the secondary winding of the transformer; and a receiver subsystem including: a rectifier including an input and an output, the input being coupled to the respective second ends of the first and second elongated conductors to receive an AC signal therefrom, and the rectifier operative to rectify the AC signal to provide a rectified AC signal at the output of the rectifier.

The receiver subsystem may further include a low pass filter coupled to the output of the rectifier, the low pass filter operative to smooth the rectified AC signal to provide output DC power to the load. The resonant tank circuit of the resonant converter of the sender subsystem may further include a resonant capacitor coupled in parallel with the primary winding of the transformer. The resonant converter of the sender subsystem may include a resonant push-pull converter. The resonant converter of the sender subsystem may include a resonant Royer converter. The resonant converter of the sender subsystem may include a zero-voltage switching (ZVS) full-bridge converter. The resonant converter of the sender subsystem may include a phase shifted full bridge converter. The receiver subsystem may include a synchronous rectifier. The receiver subsystem may include at least one rectifying diode. The receiver subsystem may include a resonant converter. The resonant converter of the receiver subsystem may have a nominal resonant frequency that is a non-integer multiple of the nominal resonant frequency of the resonant converter of the sender subsystem. The resonant converter of the receiver subsystem may have a nominal resonant frequency that is at least ten times greater than the nominal resonant frequency of the resonant converter of the sender subsystem. The resonant converter of the receiver subsystem may have a nominal resonant frequency that is at least ten times greater than of the nominal resonant frequency of the resonant converter of the sender subsystem, and is a non-integer multiple of the nominal resonant frequency of the resonant converter of the sender subsystem. The receiver subsystem may include a discontinuous conduction mode flyback converter. The first elongated conductor and the second elongated conductor may be twisted together to form twisted pair conductors. The first elongated conductor and the second elongated conductor may each have a length that is greater than ten meters. The first elongated conductor and the second elongated conductor may each have a diameter that is less than 0.25 square millimeters ($mm^2$). The nominal resonant frequency of the resonant converter of the sender subsystem may be between 80 kilohertz and 100 kilohertz. The transmission subsystem may include a third elongated conductor operative to carry data signals. The first and second elongated conductors may include a twisted pair of conductors in an Ethernet cable.

A power distribution system to deliver power to a load may be summarized as including: a sender subsystem may be summarized as including: a transformer including a primary winding and a secondary winding; and a resonant converter coupleable to a direct current (DC) power source, the resonant converter including a switch network and a resonant tank circuit operatively coupled to the switch network, the resonant tank circuit including the primary winding of the transformer; a transmission subsystem including: a first elongated conductor having a first end and a second end, the first end coupled to a first end of the secondary winding of the transformer; and a second elongated conductor having a first end and a second end, the first end coupled to a second end of the secondary winding of the transformer; and a receiver subsystem including: a rectifier including an input and an output, the input being coupled to the respective second ends of the first and second elongated conductors to receive an AC signal therefrom, and the rectifier operative to rectify the AC signal to provide a rectified AC signal at the output of the rectifier; and a power converter may have an input coupled to the output of the rectifier, and an output coupleable to the load to deliver power to the load.

A head-mounted display system may be summarized as including: a direct current (DC) power source; a head-mounted display; and a power distribution system operative to deliver power from the DC power source to the head-mounted display, the power distribution system including: a transformer including a primary winding and a secondary winding; a resonant converter coupleable to a direct current (DC) power source, the resonant converter including a switch network and a resonant tank circuit operatively coupled to the switch network, the resonant tank circuit including the primary winding of the transformer and resonant capacitor coupled in parallel with the primary winding of the transformer; a pair of conductors coupled to the secondary winding of the transformer; a rectifier including an input and an output, the input being coupled to the pair of conductors to receive an AC signal therefrom, and the rectifier operative to rectify the AC signal to provide a rectified AC signal at the output of the rectifier; and a power converter having an input coupled to the output of the rectifier, and an output coupleable to the head-mounted display to deliver power to the head-mounted display.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
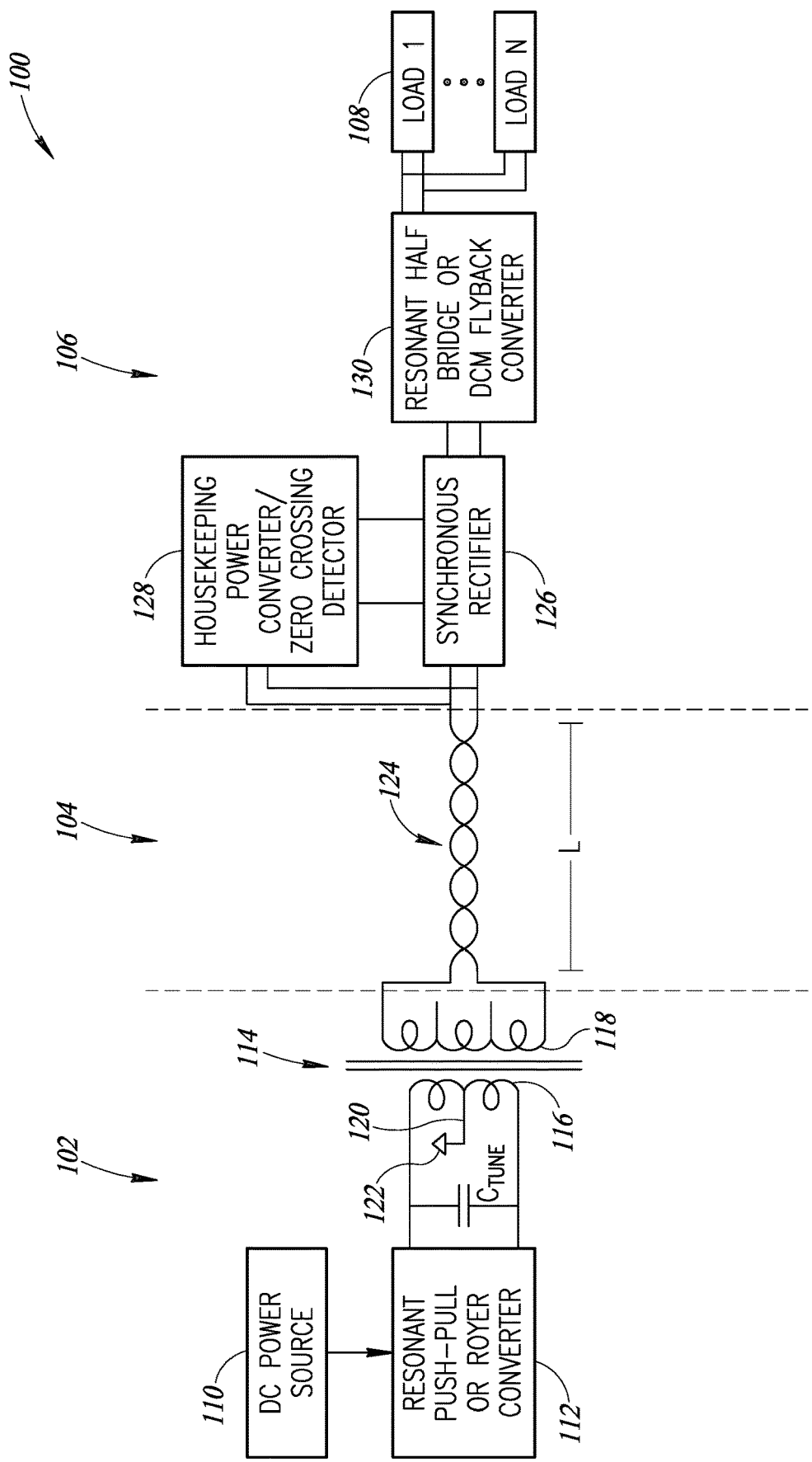
FIG. 1 is a high level schematic diagram of a power distribution system, according to one non-limiting illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for distributing power over a relatively long distance (e.g., 5 meters, 10 meters, 30 meters, 50 meters) by sending high frequency (e.g., 80-100 kHz) alternating current (AC) over a transmission subsystem from a sender subsystem to a receiver subsystem. In at least some implementations, power is sent from the sender subsystem to the receiver subsystem over a transmission subsystem that includes first and second conductors, such as pair of shielded or unshielded wires twisted together, also referred to herein as a "twisted pair" or a "twisted pair cable." In other implementations, the transmission subsystem may include first and second conductors of different types, such as two wires or cables that are not twisted together (e.g., adjacent, spaced apart), conductive traces, or any other type of material suitable to transmit electrical power from the sender subsystem to the receiver subsystem. In at least some implementations, the sender subsystem utilizes a resonant converter to provide sinusoidal oscillation, which greatly reduces the radio emissions normally caused in DC systems due to high frequency current draws by a load (e.g., a head-mounted display (HMD) device), which undesirably generates square waves that have harmonic components that extend into frequency ranges commonly used by various electronic devices.

Figure 4:
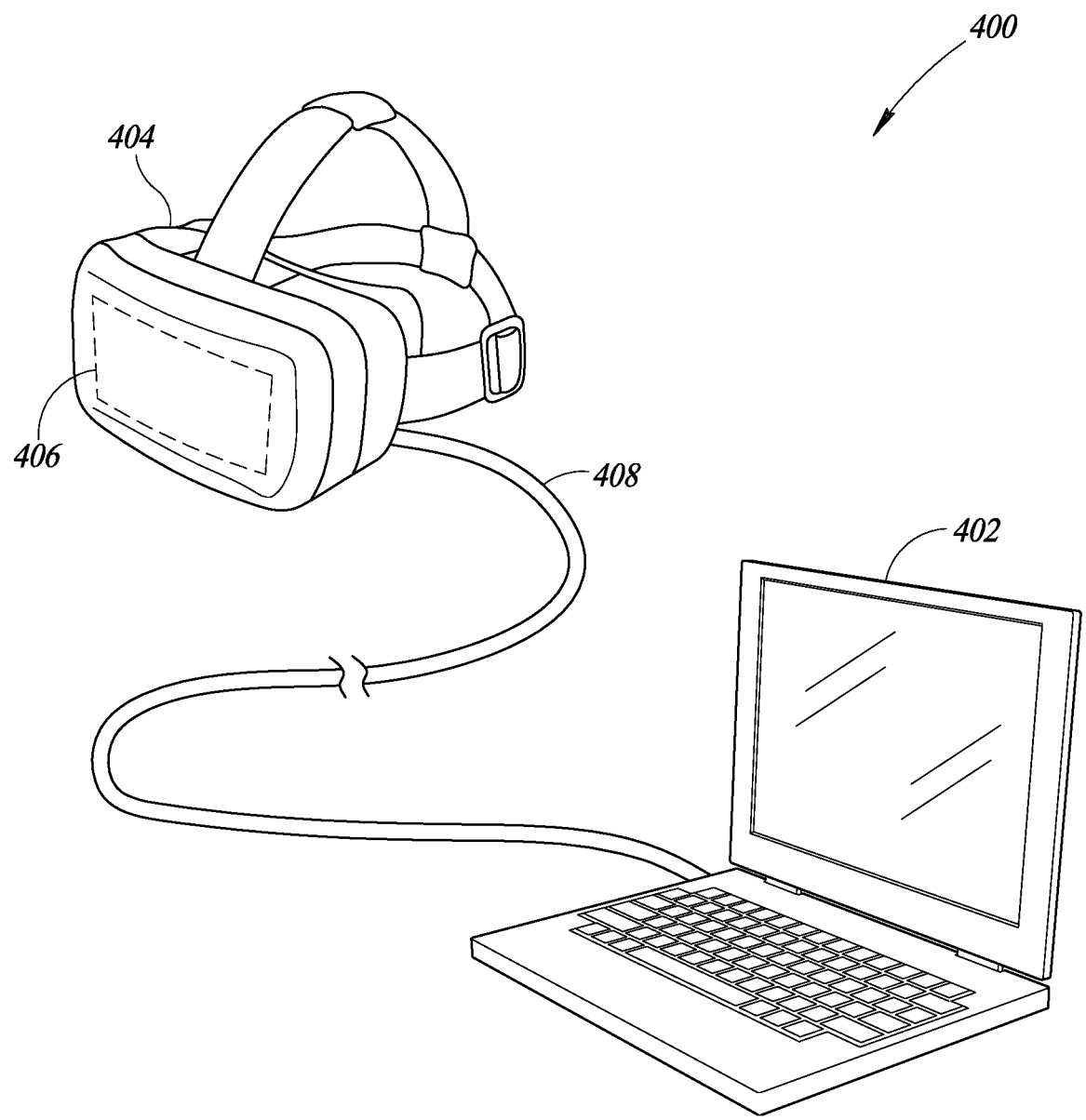
FIG. 4 is a diagram illustrating an example environment in which at least some of the described techniques are used with an example head-mounted display device that is tethered to a video rendering computing system and providing a virtual reality display to a user, according to one non-limiting illustrated implementation.

FIG. 1 shows a high level schematic diagram of a power distribution system 100 according to one non-limiting illustrated implementation of the present disclosure. The power distribution system 100 includes a sender subsystem 102, a transmission subsystem 104, and a receiver subsystem 106. The power distribution subsystem 100 is operative to receive DC power from a DC power source 110 (e.g., a computing system), and to distribute DC power to one or more loads 108 (e.g., HMD devices) positioned remote from the DC power source 110. FIG. 4, discussed below, illustrates a non-limiting example environment in which the power distribution system 100 may be implemented to provide power from a computing system to a mobile HMD device that may be worn by a user to provide a virtual reality experience for the user.

In at least some implementations, the sender subsystem 102 includes a resonant converter 112, such as a resonant push-pull converter or a self-oscillating "Royer" type converter. The converter 112 may also be a zero-voltage switching (ZVS) full-bridge converter or a phase shifted full bridge converter, for example. An isolating impedance matching transformer 114 is provided that includes a primary winding 116 and a secondary winding 118. A center tap 120 of the primary winding 116 of the transformer 114 may be coupled to a positive DC voltage source (e.g. 12 volts). The converter 112 includes a switch network (not shown in FIG. 1) that causes the current in the primary winding 116 to periodically alternate directions. A tuning or resonant capacitor $C_{TUNE}$ is coupled in parallel with the primary winding 116 such that the tuning capacitor and the primary winding 116 form a resonant tank circuit for the converter 112, which forces a sinusoidal commutation in the primary winding 116 of the transformer 114.

As discussed further below, the sender system 102 is operative to tune its own frequency as a function of the load 108 to resonant excite the resonant tank circuit formed by the tuning capacitor $C_{TUNE}$ and the primary winding 116. Under no load conditions, the circuit simply oscillates at a nominal resonant frequency in a way where energy is added to the tank circuit such that the energy consumed at no load conditions is only the energy consumed by parasitic losses in the resonant tank circuit. Advantageously, such losses are very small. In at least some implementations, the nominal resonant frequency of the resonant converter 112 is tuned based at least in part on an expected impedance characteristic (e.g., DC resistance) of the load 108. As an example, the nominal resonant frequency of the converter 112 may be between 80-100 kHz.

The transmission subsystem 104 includes first and second elongated conductors 124 that are coupled to the secondary winding 118 of the impedance matching transformer 114. The conductors 124 may have a length (L) that is suitable for various "long reach" applications. As non-limiting examples, the length (L) may be between 5 meters and 100 meters (e.g., 10 meters, 15 meters, 50 meters). In at least some implementations, the conductors 124 comprise a shielded or unshielded twisted pair copper cable and have a diameter that is less than 0.25 square millimeters (mm$^2$) (e.g., 24 AWG, 26 AWG, 28 AWG). In at least some implementations, the conductors 124 may be conductors in a standard Ethernet cable. As will be appreciated, the systems and methods disclosed herein allow for the use of relatively small diameter conductors, which allows for lightweight and flexible tethers between a power source 110 and a load 108, which is advantageous in applications where the load is mobile, such as the HMD device application discussed below with reference to FIG. 4. Generally, in at least some implementations, the conductors 124 may be positioned in a sheath with one or more other conductors operative to provide data or power signals between a power or data source device (e.g., computing system) and a power or data receiver device (e.g., HMD device).

The receiver subsystem 106 includes a synchronous rectifier 126 that has an input coupled to the conductors 124. The synchronous rectifier 126 is operative to rectify the AC signal from the conductors 124 and provide the rectified signal to a converter 130, which may in some implementations be a resonant half bridge converter or a discontinuous conduction mode (DCM) flyback converter, for example. The receiver subsystem 106 may also include a housekeeping power converter/zero crossing detector 128 that is operative to control the operation of the synchronous rectifier 126 to minimize power loss. In other implementations, diodes may be used to rectify the AC signal instead of the synchronous rectifier 126, but the losses will typically be greater using diodes due to the forward voltage drop associated with diodes.

The converter 130 is operative to receive the rectified signal from the synchronous rectifier 126, and to provide DC power to the one or more loads 108. Advantageously, the converter 130 may be operative to mitigate the non-linear burden that the synchronous rectifier 126 imparts on the system 100. In the case where the converter 130 is a resonant converter, the converter may be designed to have a nominal resonant frequency that is a non-integer multiple of the nominal resonant frequency of the resonant converter 112 of the sender subsystem 102. In at least some implementations, the resonant converter 130 of the receiver subsystem 106 may additionally be designed to have a nominal resonant frequency that is at least ten times greater than the nominal resonant frequency of the resonant converter 112 of the sender subsystem 102. Such features may reduce or minimize the negative effect the converter 130 has on the resonant converter 112 of the sender system 102.

In at least some implementations, the converter 130 is a DCM flyback converter, which has the distinct advantage that when operating, it always has current flowing in its energy transfer core in such a way that the current rises to a point, and decays completely to zero. Thus, if the DCM flyback converter delivers a substantially constant DC voltage to an electronic device load with a suitably low voltage regulation loop bandwidth (e.g., 1/10 of the frequency of the AC source powering the converter), load transients will not adversely cause the DCM flyback converter to appear as an active or reactive load to the AC source.

Figure 2:
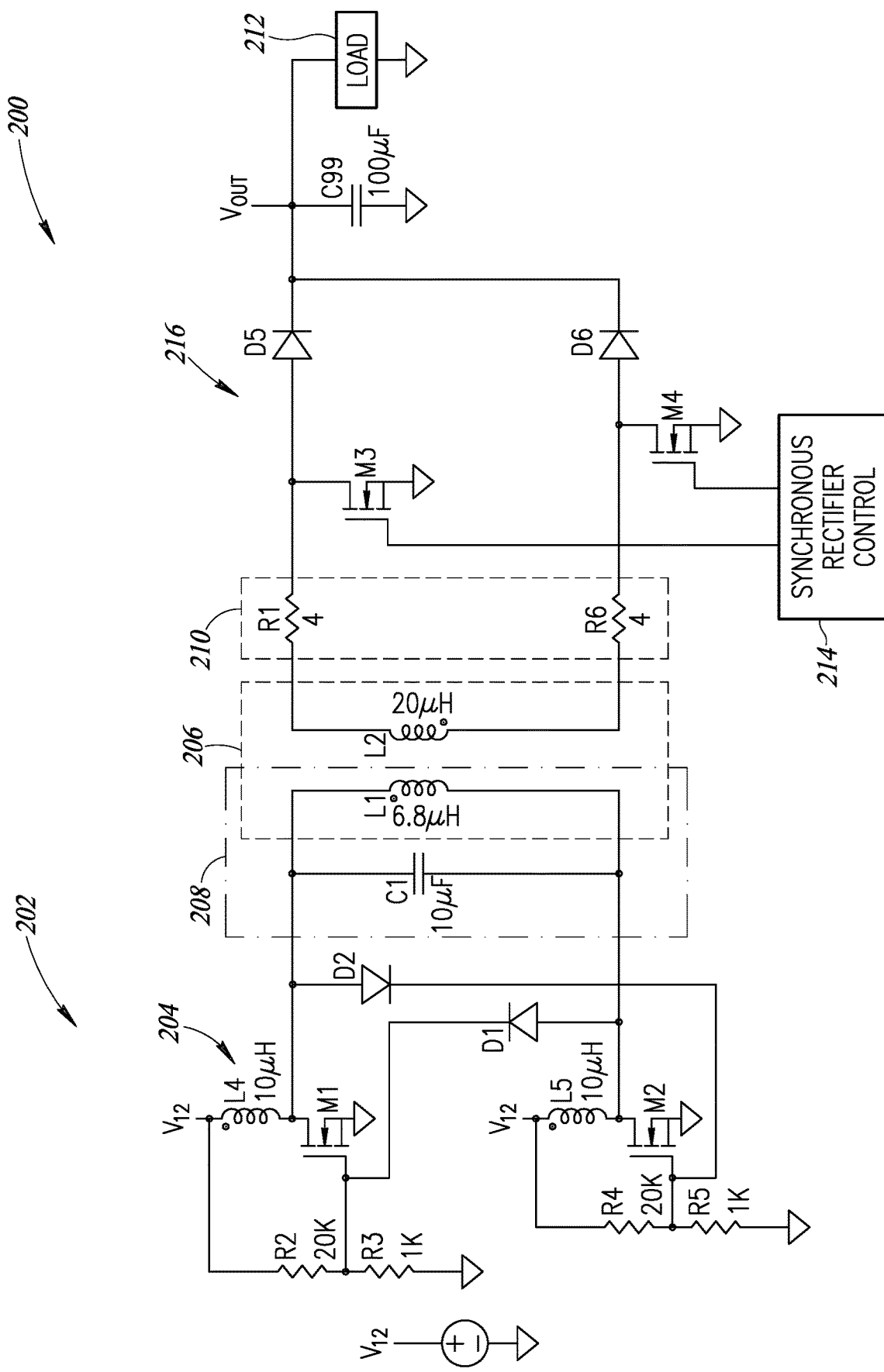
FIG. 2 is a lower level schematic diagram of a power distribution system, according to one non-limiting illustrated implementation.

FIG. 2 shows a schematic circuit diagram of a power distribution system 200 that may be used to deliver power from a power source 201 ("$V_{12}$") to a load 212 spaced apart from the power source by a distance (e.g., 10 meters, 20 meters, 50 meters). The power distribution system 200 includes a Royer type self-oscillating push-pull converter 202 that includes a switch network 204, a resonant tank circuit 208, and an impedance matching transformer 206 that includes a primary winding L1 and a secondary winding L2. The resonant tank circuit 208 includes a tuning capacitor C1 coupled in parallel with the primary winding L1 of the transformer 206. The switch network 204 includes metal-oxide-semiconductor field-effect transistors (MOSFETs) M1 and M2, inductors L4 and L5, resistors R2, R3, R4 and R5, and diodes D1 and D2. It should be appreciated that although MOSFETs are used in the example illustrated implementation, other types of devices may be used, such as bipolar junction transistors (BJTs), junction gate field-effect transistors (JFETs), insulated-gate bipolar transistors (IGBTs), other types of FETs, etc.

As shown, the drain of each of the MOSFETs M1 and M2 is cross-coupled to the gate of the opposite (out of phase) MOSFET by coupling diodes D1 and D2, respectively. The power converter 202 is fed from the power source 201 through the inductors L4 and L5 connected to the drains of the MOSFETs M1 and M2, respectively. With the two inductors L4 and L5 and the tuning capacitor C1 across the primary winding L1, the circuit operates as a Royer type converter (or inverter) wherein the primary winding L1 is resonated with the capacitance C1 and wherein the inductors L4 and L5 keep the power source $V_{12}$ from reducing the resonant action of the primary winding L1. The inductors L4 and L5 also prevent the oscillation of the primary winding L1 from feeding back to the power source $V_{12}$.

The diodes D1 and D2 provide fast turn off of the gates of the MOSFETs M1 and M2, respectively, when they are driven toward ground as the opposite phase MOSFET saturates. In operation, each of the MOSFETs M1 and M2 is turned off as the opposite phase MOSFET turns on. The voltage across the primary winding L1 reverses phase when the voltage crosses zero so that switching occurs when there is zero voltage across the MOSFET. Thus, the converter 202 provides zero voltage switching (ZVS) functionality, which minimizes losses. The pull-up resistors R2 and R3 prevent the gate of the MOSFET M1 from floating up on power on, and the pull-up resistors R4 and R5 prevent the gate of the MOSFET M2 from floating up on power on. As discussed elsewhere herein, in at least some implementations, the gates of the MOSFETs M1 and M2 may be controlled using a suitable digital controller which may reduce the potential for undesirable issues during start-up.

It should be appreciated that rather than the self-oscillating design illustrated in FIG. 2, the power converter 202 may utilize more complex control schemes to control the operation of the switch network 204. For example, amplifiers and comparators may be used to sense voltage levels or transitions, and/or logic may be implemented by a controller (e.g., a controller of a computing system or host device) to provide ZVS and maintain the tank circuit 208 operating at resonance.

In the illustrated example, the impedance matching transformer 206 has a primary winding inductance of 6.8 µH and a secondary winding inductance of 20 µH. The impedance matching transformer 206 sets both the resonant frequency of the tank circuit 208 and the voltage transform ratio. In the illustrated example, the output voltage of the transformer 206 is approximately 42 to 48 VAC, although other voltage levels may be used depending on the particular intended application.

The power converter 200 also includes a transmission subsystem 210 that comprises two 4 Ohm resistors R1 and R6. The resistors R1 and R6 are used to model 100 feet of 26 AWG wire (e.g., 100 feet of Ethernet cable), which may be representative of a suitable application for the power distribution system 200.

In the illustrate implementation, the receiver portion of the power converter 200 includes a synchronous rectifier circuit 216 that comprises MOSFETS M3 and M4, diodes D5 and D6, and a synchronous rectifier control circuit 214 that provides control signals to the gates of the MOSFETs M3 and M4. The synchronous rectifier control circuit 214 includes logic that is operative to drive the gates of the MOSFETs M3 and M4 out of phase with each other to provide rectified voltage at an output node ($V_{OUT}$). In practice, the diodes D5 and D6 may be replaced with MOSFETs and control logic to improve the efficiency of the circuit by eliminating the voltage drop across the diodes D5 and D6 during operation.

The receiver portion of the power distribution system 200 may also include a low pass filter, such as a capacitor C99, at the output voltage node ($V_{OUT}$) to provide smooth DC power to the load 212.

Figure 3:
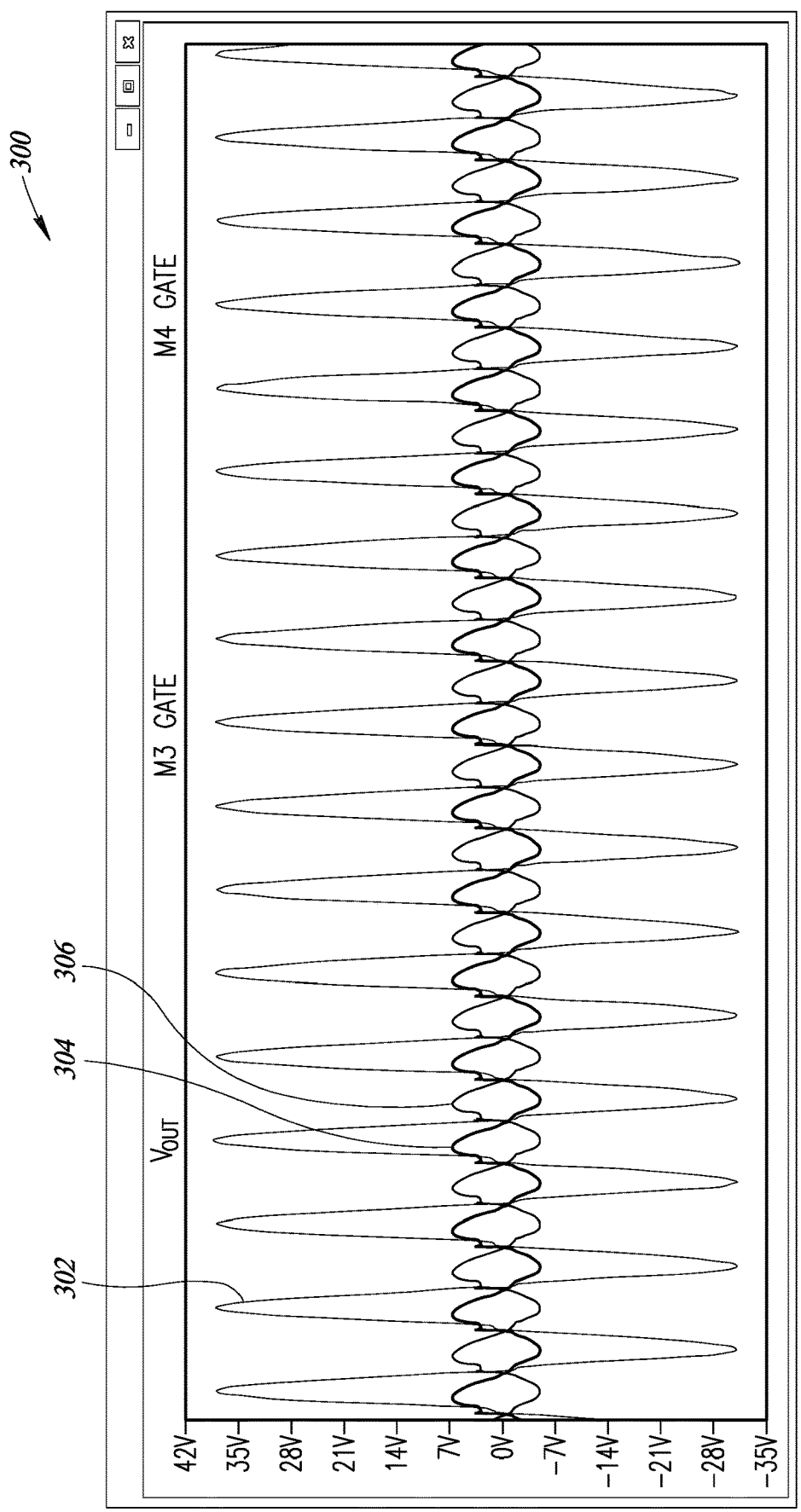
FIG. 3 is a plot of various voltage signals of the power distribution system of FIG. 2, according to one non-limiting illustrated implementation.

FIG. 3 is a diagram that shows the output voltage ($V_{OUT}$) waveform 302, a voltage waveform 304 at the gate of the MOSFET M4, and a voltage waveform 306 at the gate of the MOSFET M3. The voltage waveform 302 shows that the voltage at the output node ($V_{OUT}$) is approximately 38 VAC in this simulated example. As noted above, the values for the various components may be varied to suit a particular application as needed.

FIG. 4 illustrates a non-limiting example environment 400 in which at least some of the described techniques are used with an example HMD device 404 that is tethered to a video rendering computing system 402 via a wired tether or cable 408 to provide a virtual reality display to a human user. In this example, the HMD device 404 may receive DC power from the computing system 402 via a power distribution system similar or identical to the power distribution systems disclosed herein. For example, a sender system of the power distribution system may be positioned proximate to or in the computing system 402, a transmission subsystem (e.g., twisted pair cable) of the power distribution system may be inside the tether 408, and a receiver subsystem of the power distribution system may be positioned at or in the HMD device 404.

In operation, the user wears the HMD device 404 and receives displayed information via a display 406 of the HMD device from the computing system 402 of a simulated environment different from the actual physical environment, with the computing system acting as an image rendering system that supplies images of the simulated environment to the HMD device for display to the user, such as images generated by a game program (not shown) and/or other software program (not shown) executing on the computing system. The user is further able to move around the actual physical environment in this example, and may further have one or more I/O ("input/output") devices to allow the user to further interact with the simulated environment, such as hand-held controllers that are communicatively coupled to the computing system via wired or wireless connections. As the user moves location and/or changes orientation of the HMD device, the position of the HMD device may be tracked, such as to allow a corresponding portion of the simulated environment to be displayed to the user on the HMD device, and the controllers may further employ similar techniques to use in tracking the positions of the controllers (and to optionally use that information to assist in determining and/or verifying the position of the HMD device). After the tracked position of the HMD device is known, corresponding information is transmitted to the computing system 402 via the tether or cable 408, which uses the tracked position information to generate one or more next images of the simulated environment to display to the user.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A head-mounted display system, comprising:
 a head-mounted display; and
 a power distribution system to deliver power to a load, the power distribution system comprising:
  a sender subsystem comprising:
   a transformer comprising a primary winding and a secondary winding; and
   a resonant converter coupleable to a direct current (DC) power source, the resonant converter having a nominal resonant frequency that is tuned based at least in part on an impedance characteristic of the load, the resonant converter comprising a switch network and a resonant tank circuit operatively coupled to the switch network, the resonant tank circuit comprising the primary winding of the transformer;
  a transmission subsystem comprising:
   a first elongated conductor having a first end and a second end, the first end coupled to a first end of the secondary winding of the transformer; and
   a second elongated conductor having a first end and a second end, the first end coupled to a second end of the secondary winding of the transformer, wherein the first elongated conductor and the second elongated conductor are twisted together to form twisted pair conductors; and
  a receiver subsystem comprising:
   a rectifier comprising an input and an output, the input being coupled to the respective second ends of the first and second elongated conductors to receive an AC signal therefrom, and the rectifier operative to rectify the AC signal to provide a rectified AC signal at the output of the rectifier.

2. The head-mounted display system of claim 1 wherein the receiver subsystem further comprises a low pass filter coupled to the output of the rectifier, the low pass filter operative to smooth the rectified AC signal to provide output DC power to the load.

3. The head-mounted display system of claim 1 wherein the resonant tank circuit of the resonant converter of the sender subsystem further comprises a resonant capacitor coupled in parallel with the primary winding of the transformer.

4. The head-mounted display system of claim 1 wherein the resonant converter of the sender subsystem comprises a resonant push-pull converter.

5. The head-mounted display system of claim 1 wherein the resonant converter of the sender subsystem comprises a resonant Royer converter.

6. The head-mounted display system of claim 1 wherein the resonant converter of the sender subsystem comprises a zero-voltage switching (ZVS) full-bridge converter.

7. The head-mounted display system of claim 1 wherein the resonant converter of the sender subsystem comprises a phase shifted full bridge converter.

8. The head-mounted display system of claim 1 wherein the receiver subsystem comprises a synchronous rectifier.

9. The head-mounted display system of claim 1 wherein the receiver subsystem comprises at least one rectifying diode.

10. The head-mounted display system of claim 1 wherein the receiver subsystem comprises a resonant converter.

11. The head-mounted display system of claim 10 wherein the resonant converter of the receiver subsystem has a nominal resonant frequency that is a non-integer multiple of the nominal resonant frequency of the resonant converter of the sender subsystem.

12. The head-mounted display system of claim 10 wherein the resonant converter of the receiver subsystem has a nominal resonant frequency that is at least ten times greater than the nominal resonant frequency of the resonant converter of the sender subsystem.

13. The head-mounted display system of claim 10 wherein the resonant converter of the receiver subsystem has a nominal resonant frequency that is at least ten times greater than of the nominal resonant frequency of the resonant converter of the sender subsystem, and is a non-integer multiple of the nominal resonant frequency of the resonant converter of the sender subsystem.

14. The head-mounted display system of claim 1 wherein the receiver subsystem comprises a discontinuous conduction mode flyback converter.

15. The head-mounted display system of claim 1 wherein the first elongated conductor and the second elongated conductor each have a length that is greater than ten meters.

16. The head-mounted display system of claim 1 wherein the first elongated conductor and the second elongated conductor each have a diameter that is less than 0.25 square millimeters ($mm^2$).

17. The head-mounted display system of claim 1 wherein the nominal resonant frequency of the resonant converter of the sender subsystem is between 80 kilohertz and 100 kilohertz.

18. The head-mounted display system of claim 1 wherein the transmission subsystem comprises a third elongated conductor operative to carry data signals.

19. The head-mounted display system of claim 1 wherein the first and second elongated conductors comprise a twisted pair of conductors in an Ethernet cable.

20. A head-mounted display system, comprising:
 a head-mounted display; and
 a power distribution system to deliver power to a load, the power distribution system comprising:
  a sender subsystem comprising:
   a transformer comprising a primary winding and a secondary winding; and
   a resonant converter coupleable to a direct current (DC) power source, the resonant converter comprising a switch network and a resonant tank circuit operatively coupled to the switch network, the resonant tank circuit comprising the primary winding of the transformer;
  a transmission subsystem comprising:
   a first elongated conductor having a first end and a second end, the first end coupled to a first end of the secondary winding of the transformer; and
   a second elongated conductor having a first end and a second end, the first end coupled to a second end of the secondary winding of the transformer, wherein the first elongated conductor and the second elongated conductor are twisted together to form twisted pair conductors; and
  a receiver subsystem comprising:
   a rectifier comprising an input and an output, the input being coupled to the respective second ends of the first and second elongated conductors to receive an AC signal therefrom, and the rectifier operative to rectify the AC signal to provide a rectified AC signal at the output of the rectifier; and a power converter having an input coupled to the output of the rectifier, and an output coupleable to the load to deliver power to the load.

21. A head-mounted display system, comprising:
a direct current (DC) power source;
a head-mounted display; and
a power distribution system operative to deliver power from the DC power source to the head-mounted display, the power distribution system comprising:
 a transformer comprising a primary winding and a secondary winding;
 a resonant converter coupleable to a direct current (DC) power source, the resonant converter comprising a switch network and a resonant tank circuit operatively coupled to the switch network, the resonant tank circuit comprising the primary winding of the transformer and resonant capacitor coupled in parallel with the primary winding of the transformer;
 a pair of conductors coupled to the secondary winding of the transformer;
 a rectifier comprising an input and an output, the input being coupled to the pair of conductors to receive an AC signal therefrom, and the rectifier operative to rectify the AC signal to provide a rectified AC signal at the output of the rectifier; and
 a power converter having an input coupled to the output of the rectifier, and an output coupleable to the head-mounted display to deliver power to the head-mounted display.

22. The head-mounted display system of claim 21 wherein the resonant converter comprises a resonant push-pull converter.

23. The head-mounted display system of claim 21 wherein the resonant converter comprises a resonant Royer converter.

24. The head-mounted display system of claim 21 wherein the resonant converter comprises a zero-voltage switching (ZVS) full-bridge converter.

25. The head-mounted display system of claim 21 wherein the resonant converter comprises a phase shifted full bridge converter.

26. The head-mounted display system of claim 21 wherein the first elongated conductor and the second elongated conductor are twisted together to form twisted pair conductors.

27. The head-mounted display system of claim 21 wherein the first elongated conductor and the second elongated conductor each have a length that is greater than ten meters.

28. The head-mounted display system of claim 21 wherein the first elongated conductor and the second elongated conductor each have a diameter that is less than 0.25 square millimeters ($mm^2$).

29. The head-mounted display system of claim 21 wherein the nominal resonant frequency of the resonant converter is between 80 kilohertz and 100 kilohertz.

30. The head-mounted display system of claim 21 wherein the first and second elongated conductors comprise a twisted pair of conductors in an Ethernet cable.

* * * * *